UNITED STATES PATENT OFFICE.

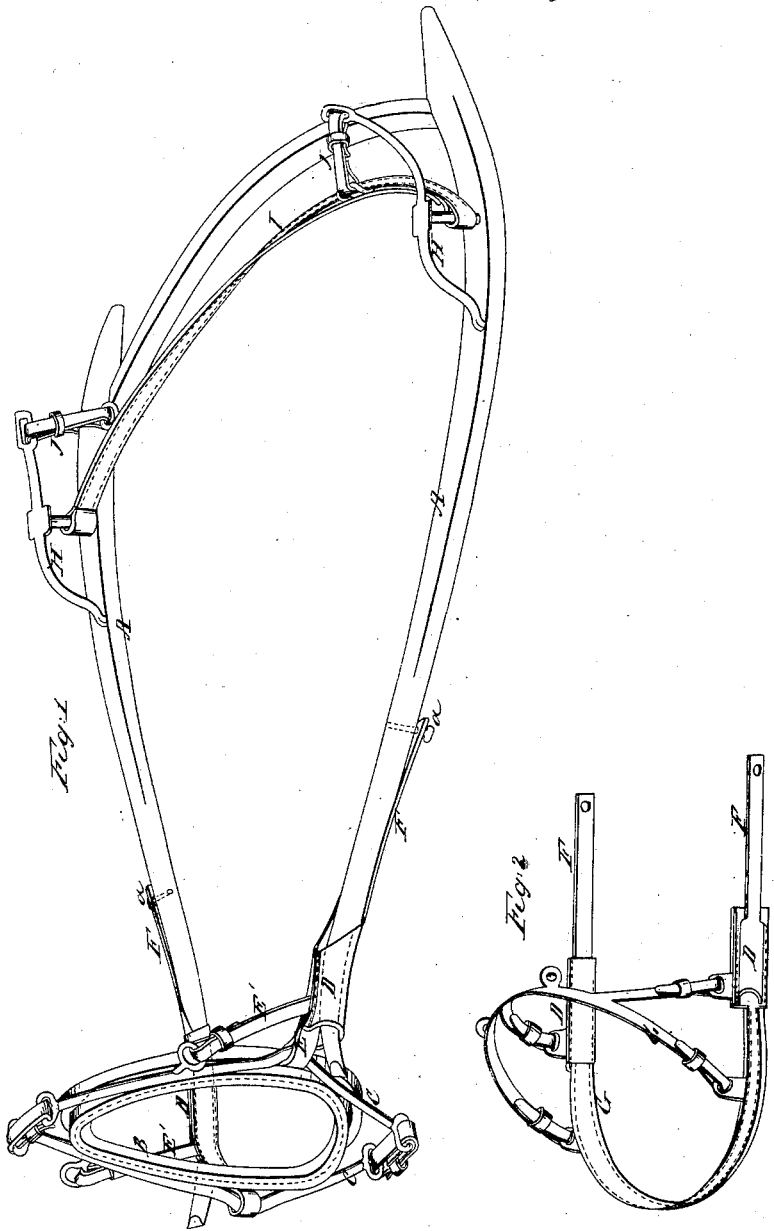

S. L. BOND, OF GREENWOOD, SOUTH CAROLINA.

HARNESS.

Specification of Letters Patent No. 30,457, dated October 23, 1860.

*To all whom it may concern:*

Be it known that I, S. L. BOND, of Greenwood, in the district of Abbeville and State of South Carolina, have invented a new and useful Improvement in Harnesses; and I do hereby declare that the following is a full, clear, and exact description of the same, reference being had to the annexed drawings, making a part of this specification, in which—

Figure 1 is a perspective view of my invention. Fig. 2 is a detached perspective view of a collar of the same.

Similar letters of reference indicate corresponding parts in the two figures.

The object of this invention is to attach a horse to a wagon in a much simpler way than by the ordinary harness, and with far less expense.

The invention consists in attaching the collar to the shafts, and also the back strap, as hereinafter fully shown and described, whereby the desired end is attained.

To enable those skilled in the art to fully understand and construct my invention I will proceed to describe it.

A, A represent a pair of thills which may be attached to the vehicle in any of the known ways.

B is a horse collar which has hames C, fitted on it, and to the hames sockets D, D, are attached by straps E, E', a socket being at each side of the collar. These sockets may be of leather and they support the thills A, A. Straps F, are attached to the sockets D, D, and form traces which are secured to the thills A, as shown at *a, a*. The collar B, is of the usual stuffed kind, but the simple Dutch collar G, may be used if necessary, as shown in Fig. 2.

To the back part of the thills A, A, there are secured curved irons H, H, one to each thill. These irons are curved upward and inward, their back ends extending toward each other. Each iron H, had a vertical rod *b*, as a support or stay, and to these rods the ends of a back strap I, are attached, said strap being supported by small suspension straps J, J, which are attached to the back ends of the irons H, H.

By this arrangement it will be seen that many of the parts required in the ordinary harness are dispensed with, and that the horse may be attached to and detached from a vehicle with greater facility than hitherto. The arrangement is extremely simple, and, while answering equally as well as the ordinary harness, does not cost near as much in the first place, and as there are no parts liable to be injured or chafed by wear, as in the ordinary harness, the expense in keeping it in repair is trifling. Another advantage also the invention possesses, viz.: the dispensing with the ordinary harness saddle, which frequently renders the back of the animal sore in consequence of a continual chafing or rubbing produced by the movement of the animal.

Having thus described my invention, what I claim as new, and desire to secure by Letters Patent, is:—

The combination of the collar B, or G, with the back strap I, when both are attached to the thills A, A, as and for the purpose specified.

S. L. BOND.

Witnesses:
T. C. CREWS,
C. W. CREWS.